United States Patent [19]

Clouser et al.

[11] Patent Number: 5,366,612
[45] Date of Patent: Nov. 22, 1994

[54] PROCESS FOR MAKING COPPER FOIL

[75] Inventors: Sidney J. Clouser, Chardon, Ohio;
Michael A. Eamon, Tucson, Ariz.;
Thomas L. Jordan, Oracle, Ariz.;
Stephen I. Kohut, Chandler, Ariz.

[73] Assignees: Magma Copper Company, Tucson, Ariz.; Gould Electronics Inc., Eastlake, Ohio

[21] Appl. No.: 49,176

[22] Filed: Apr. 19, 1993

[51] Int. Cl.$^5$ .......................... C25D 1/04; C25D 1/20
[52] U.S. Cl. ...................................... 205/73; 204/108; 205/77; 205/138
[58] Field of Search .................... 205/104, 73, 77, 138; 204/108

[56] References Cited

U.S. PATENT DOCUMENTS

| | | | |
|---|---|---|---|
| 1,058,048 | 4/1913 | Gibbs | 205/138 |
| 1,959,376 | 5/1934 | Lucas | 264/1 |
| 2,053,222 | 9/1936 | Lucas | 204/5 |
| 3,148,130 | 9/1964 | Brace et al. | 204/96 |
| 3,282,682 | 11/1966 | Harlan | 75/117 |
| 3,535,218 | 10/1970 | Brown et al. | 204/108 |
| 3,556,957 | 1/1971 | Toledo et al. | 204/32 |
| 3,616,277 | 10/1971 | Adamson et al. | 204/10 |
| 3,661,740 | 5/1972 | Brace et al. | 204/96 |
| 3,681,056 | 8/1972 | Lyon et al. | 75/108 |
| 3,844,763 | 10/1974 | Burkin | 75/0.5 A |
| 4,023,964 | 5/1977 | DeMarthe et al. | 75/101 R |
| 4,030,990 | 6/1977 | Piret et al. | 204/108 |
| 4,069,119 | 1/1978 | Wong | 204/106 |
| 4,133,746 | 1/1979 | Dopson | 209/1 |
| 4,150,976 | 4/1979 | Dain | 75/117 |
| 4,193,846 | 3/1980 | Barrett | 204/13 |
| 4,484,990 | 11/1984 | Bultman et al. | 204/106 |
| 4,544,460 | 10/1985 | Ochs | 204/107 |
| 4,561,887 | 12/1985 | Domic et al. | 75/65 R |
| 4,874,534 | 10/1989 | Sorensen et al. | 210/803 |
| 4,956,053 | 9/1990 | Polan et al. | 204/13 |
| 4,957,714 | 9/1990 | Olafson et al. | 423/24 |
| 5,215,645 | 6/1993 | DiFranco et al. | 205/77 |

OTHER PUBLICATIONS

Magna Copper Company, SX–EW/Solvent Extraction: Electrowinning, pp. 1–4 (no date).
Townson and Severs, The Solvent Extraction of Copper–A Perspective, pp. 1–6 (no date).

(List continued on next page.)

Primary Examiner—Kathryn Gorgos
Assistant Examiner—Edna Wong
Attorney, Agent, or Firm—Michael A. Centanni

[57] ABSTRACT

The present invention relates to a process for making copper foil from copper-bearing material comprising:
(A) contacting said copper-bearing material with an effective amount of at least one aqueous leaching solution to dissolve copper ions into said leaching solution and form a copper-rich aqueous leaching solution;
(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution;
(C) separating said copper-rich extractant from said copper-depleted aqueous leaching solution;
(D) contacting said copper-rich extractant with an effective amount of at least one aqueous stripping solution to transfer copper ions from said extractant to said stripping solution to form a copper-rich stripping solution and a copper-depleted extractant;
(E) separating said copper-rich stripping solution from said copper-depleted extractant;
(F) flowing said copper-rich stripping solution between an anode and a rotating cathode, and applying an effective amount of voltage across said anode and said cathode to deposit copper on said cathode; and
(G) continuously removing copper foil from said cathode.

23 Claims, 1 Drawing Sheet

OTHER PUBLICATIONS

Kordosky, Copper Solvent Extraction: The State of the Art, pp. 40–45 (May 1992).

Argall, "Copper Oxide to Copper Cathode", *World Mining*, Aug. 1976, pp. 48–51.

Bucci et al, "Copper Foil Technology", PC Fab, Jul. 1986, pp. 22–31.

Coppertron, "An Installation for and Method of Electrolytic Production of Copper Foils", British Patent 1,588,681 (Apr. 1981), Abstract 24051.

Eamon et al, "Plant Practices & Innovations", TMS Symposium, New Orleans, La., Feb. 1991, pp. 1–17.

Enchev et al, "Production of Copper Powder by the Method of Electrolytic Extraction Using a Reversing Current", *Sov. Powder Met. & Met. Ceramics*, V. 13, No. 9 (Sep. 1974), Translation by Plenum Publishing Corp. (1975), pp. 764–766.

Harper et al, "The Electrodeposition of Copper Powder With the Aid of Surfactants", Refinery and Mill Operations–Part I, CDA–ASM Conference, Oct., 1972, Cleveland, Ohio.

Jayaweera et al, "Purification of Copper Amine Solution During the Production of Copper Oxide", Chemeca 86, 14th Aust. Chem. Engr. Conf. (1986), pp. 95–100 (no month).

Klar, "Production of Copper by the Reduction of Copper Oxide", Metals Handbook, Ninth Edition, vol. 7, pp. 105–120 (no date).

Kordosky, "Copper Solvent Extraction: The State of the Art", JOM, May 1992, pp. 40–45.

Magma Copper Company, Pamphlet entitled "SX–EW/Solvent Extraction-Electrowinning". (no date).

Makowski et al, "Properties of Electrodeposited Foils for Use in Printed Circuits", *Symposium on Electrodeposited Metals as Materials for Selected Applications*, Battelle, Columbus, Ohio, (Jan., 1972), pp. 14–31, Abstract 17448.

Singh et al, "A Continuous & Self Regulating Method for Making Copper Powder by Electrolysis", NML Technical Journal, vol. 17, Feb.–May 1975, pp. 23–26.

Taubenblat, "Electrodeposition of Metal Powders", *Metals Handbook Ninth Edition*, vol. 7. (no date).

Towson et al, "The Solvent Extraction of Copper–a Perspective", Reprinted for *Mining Journal Limited*, London. (no date).

Usol'tseva et al, "Electrodeposition of Fine Copper Powders in the Presence of Organic Additions", Plenum Publishing Corporation, (1983), pp. 610–613, Translation from Poroshkovauh Metallurgiga, No. 8 (248) pp. 16–20, Aug. 1983.

Walker et al, "The Morphology and Properties of Electrodeposited Copper Powder", *Surface Technology*, 23 (1984) pp. 301–321. (no month).

Williams, "Copper Powder Production at Nordduetsche Affinerie", MPR, Jan. 1989.

"The Economics of Pressing Grade Copper Powder Production", MPR, May 1984, pp. 251–255.

"Non–Ferrous Powder Production at Makin", MPR, Jan. 1987, pp. 15–20.

"Electrowon Cathode Takes Growing Share of Wiremill Market", Copper Studies, vol. 18, No. 10, Apr. 1991, pp. 7–12.

PROCESS FOR MAKING COPPER FOIL

TECHNICAL FIELD

This invention relates to a process for making copper foil. More particularly, this invention relates to a process using an extractant for extracting copper from copper-bearing materials and making copper foil from such copper.

BACKGROUND OF THE INVENTION

The process for recovery of copper metal values from ores and processing liquids by solvent extraction-electrowinning (hereafter, "SX-EW") is well-known. Briefly, the process is carried out using a copper-bearing aqueous solution which is obtained by dissolving (generally from an ore) the copper in an aqueous leach liquor, or by using a copper-bearing solution such as process effluent. The resulting solution of copper values is mixed with a water-immiscible organic solvent (e.g., kerosene) containing a water-insoluble ion exchange composition having selective affinity for the copper values. The ion exchange composition preferentially extracts the copper values from the aqueous solution. The aqueous and organic phases are separated. The aqueous solution, now copper-depleted, is usually referred to as "raffinate." The raffinate can be recycled as leach liquor (in a leaching process) or discarded (in a process such as recovery of copper from process effluent). The organic phase (which contains ion exchange composition and the extracted copper values) is usually referred to as "loaded organic." The desired copper values are removed from the loaded organic by mixing with an aqueous strip solution containing strong acid such as sulfuric, phosphoric, or perchloric acid, and having lower pH than the above copper-bearing aqueous solution. The aqueous strip solution extracts the desired copper values from the loaded organic. After separation of the organic and aqueous phases, the desired copper values are present in the aqueous strip solution. The resulting copper-rich aqueous strip solution is usually referred to as an "electrolyte" or "rich electrolyte." The copper-depleted organic phase is usually referred to as a "barren organic." The barren organic can be recycled.

Copper is recovered in purified form from the electrolyte by a technique known as "electrowinning" (hereafter sometimes referred to as "EW"). The electrowinning process typically involves plating the copper on copper starting sheets or stainless steel cathode mother blanks. The plating cycle usually takes about seven days to obtain a 100-pound cathode from each side of the mother blank. The cathodes are stripped mechanically from each side of the mother blank and are then available for further processing which can include drawing, rolling, etc. Often these cathodes are transported to a rod plant wherein they are subjected to continuous casting. After recovery of the desired copper, the copper-depleted electrolyte, which is sometimes referred to as "lean electrolyte," can be recycled as aqueous strip solution for fresh loading with copper values.

The production of copper foil by electrodeposition involves the use of an electroforming cell containing an anode, a cathode, an electrolyte solution containing copper ions and sulfate ions, and a source of current. Through the application of voltage between the anode and the cathode the deposition of copper is effected on the cathode surface. The process begins with the copper feed stock which is dissolved in sulfuric acid to form the electrolyte solution. The feedstock is an electrolytically purified form of copper such as copper shot, copper wire, copper oxide or recycled copper. The resulting copper sulfate solution is then purified in order to ensure that high purity copper sulfate required for the production of foil is generated. Various types of agents for controlling the properties of the foil such as animal glue and thiourea can be added to the electrolyte solution. The electrolyte solution is pumped into the electroforming cell, and with the application of voltage between the anode and cathode, the electrodeposition of copper takes place. Typically the process involves using cylindrical cathodes that may be of varying diameters and widths. The anodes conform to the curvature of the cathodes so as to maintain a constant separation or gap between the two.

The electrolytically purified copper feedstocks used in prior art electrodeposition processes are often produced using SX-EW techniques of the type discussed above. They are also made using traditional smelting and refining techniques. The prior art electrodeposition processes, which involve initially dissolving the copper feedstock in a digester to form copper ions, are slow, difficult to control, and require large quantities of expensive pure copper inventoried in the digester. It would be advantageous if copper foil could be produced directly from relatively impure sources of copper such as copper ore or copper-containing waste without the additional steps of first recovering pure copper using electrolysis and then dissolving the pure copper to obtain copper ions for the electrolyte solution. The present invention provides such an advantage.

By virtue of the inventive process copper foil is produced using fewer manipulative steps when compared to prior art practices. The inventive process utilizes a copper source that does not require in its production the additional steps of electrowinning, drawing, etc., which are used in making the electrolytically purified copper feedstocks (e.g., copper shot, copper wire, copper oxide, recycled copper, etc.) used in the prior art. Also, the inventive process does not require the use of the digestion step used at the commencement of prior art electrodeposition processes. Impurities carried from the extraction steps used in the inventive process to the electrolyte solution of the process do not degrade the performance characteristics of the copper foil. Copper foil made by the inventive process is produced in a simplified and less costly manner when compared to the prior art.

SUMMARY OF THE INVENTION

The present invention is directed to a process for making copper foil from copper-bearing material comprising:
(A) contacting said copper-bearing material with an effective mount of at least one aqueous leaching solution to dissolve copper ions into said leaching solution and form a copper-rich aqueous leaching solution;
(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution;

(C) separating said copper-rich extractant from said copper-depleted aqueous leaching solution;

(D) contacting said copper-rich extractant with an effective mount of at least one aqueous stripping solution to transfer copper ions from said extractant to said stripping solution to form a copper-rich stripping solution and a copper-depleted extractant;

(E) separating said copper-rich stripping solution from said copper-depleted extractant;

(F) flowing said copper-rich stripping solution between an anode and a rotating cathode, and applying an effective amount of voltage across said anode and said cathode to deposit copper on said cathode; and (G) continuously removing copper foil from said cathode.

DESCRIPTION OF THE PREFERRED EMBODIMENTS

Figure 1:
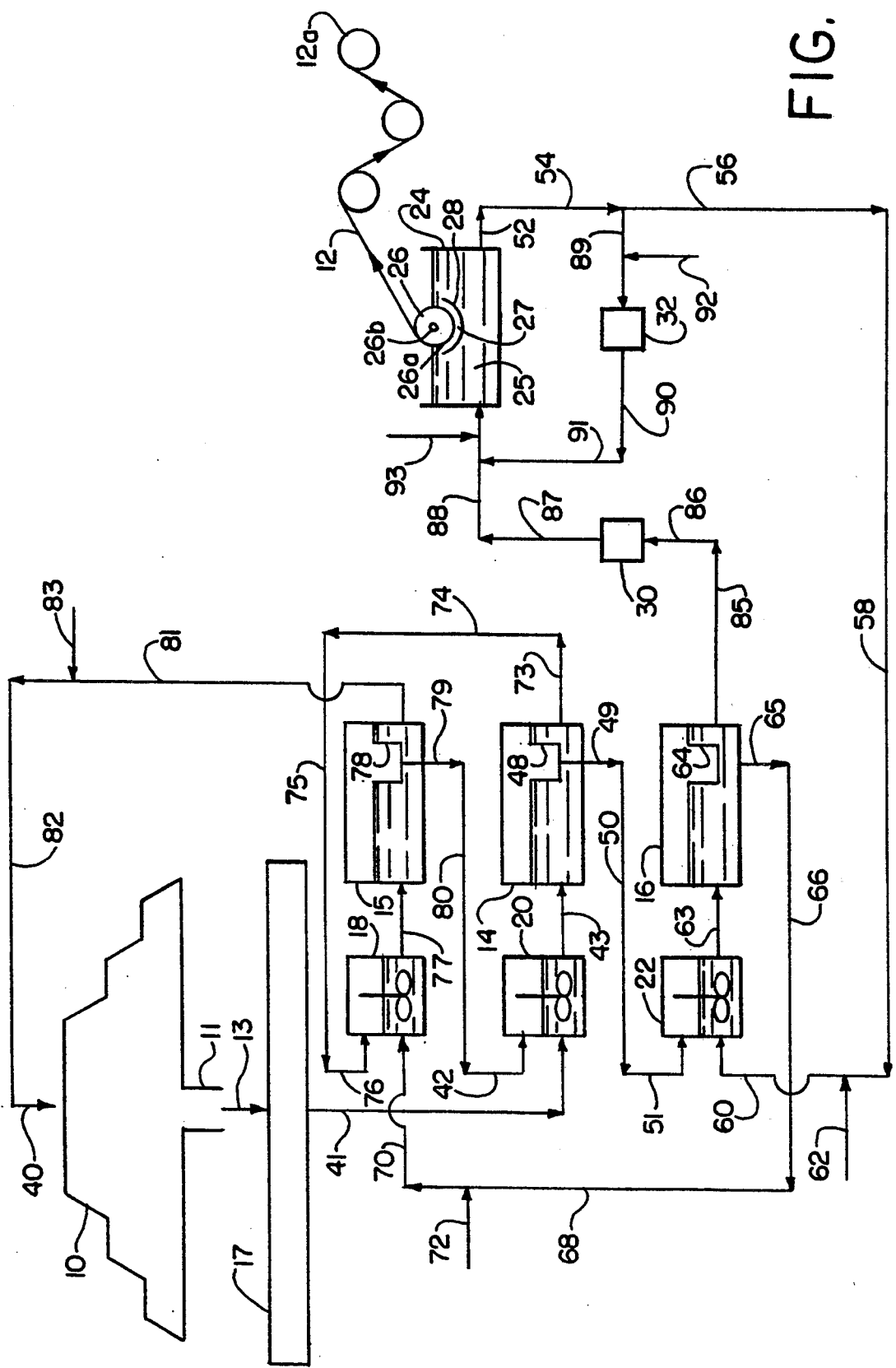
FIG. 1 is a flow sheet illustrating the process of the invention in a preferred embodiment.

The copper-bearing material can be any source of copper from which copper can be extracted. These sources include copper ore, smelter flue dust, copper cement, copper sulfate, and copper-containing waste. The term "copper-containing waste" refers to any solid or liquid waste material (e.g., garbage, sludge, effluent streams, etc.) that contains copper. These waste materials include hazardous wastes. Specific examples of wastes that can be used are copper oxides obtained from treating spent cupric chloride etchants. Also, copper sources used in the prior art such as copper shot, copper wire, recycled copper, etc., can be used, but the economic advantages of using the inventive process are reduced when such prior art sources are used.

In one embodiment copper ore from an open pit mine is used as the copper-bearing material. The ore is hauled to a heap-leaching dump which is typically built on an area underlain with a liner, such as a thick high-density polyethylene liner, to prevent loss of leaching fluids into the surrounding water shed. A typical heap-leaching dump has a surface area of, for example, about 125,000 square feet and contains approximately 110,000 tons of ore. As leaching progresses and new dumps are built on top of the old dumps, they become increasingly higher and eventually reach heights of, for example, about 250 feet or more. A network of pipes and wobbler sprinklers is laid on the surface of a newly completed dump and a weak solution of sulfuric acid is continuously sprayed at a rate of, for example, about 0.8 gallon per minute per 100 square feet of surface area. The leaching solution percolates down through the dump, dissolves copper in the ore, flows from the dump base as a copper-rich aqueous leach solution, drains into a collection pond, and is pumped to a feed pond for subsequent treatment using the inventive process.

With some mining operations in-situ leaching is used to extract copper values from copper ore. The copper-rich leach solution obtained by this process can be used in the inventive process as the copper-bearing material. In-situ leaching is useful when reserves of acid-soluble oxide ore lie beneath an open pit area and above the depleted portion of an underground mine. Injection wells are drilled into this zone at a depth of, for example, about 1000 feet. The wells are cased with polyvinylchloride pipe, the bottom portion of which is slotted to allow solution into the ore. A leach solution of weak sulfuric acid is injected into each well at a rate dependent upon the permeability of the zone into which it is drilled. The solution percolates down through the ore zone, dissolves the copper minerals, and drains into a prepared collection area. The collection area can be, for example, haulage drifts of the underground mine. The copper-bearing aqueous leach solution that is produced is pumped to the surface by means of a corrosion-resistant pumping system where it is available for use as the copper-bearing material for the inventive process.

In mining operations wherein both leach dumps and in-situ leaching are employed, the copper-bearing leach solution (sometimes referred to as a pregnant leach solution) from each can be combined and used as the copper-bearing material in the inventive process.

The aqueous leaching solution used in step (A) of the inventive process is preferably a sulfuric acid solution or an ammonia solution. The sulfuric acid solution preferably has a free sulfuric acid concentration in the range of about 5 to about 50 grams per liter, more preferably about 5 to about 40 grams per liter, more preferably about 10 to about 30 grams per liter.

The ammonia solution preferably has an ammonia concentration in the range of about 20 to about 140 grams per liter, more preferably about 30 to about 90 grams per liter. The pH of this solution is preferably in the range of about 7 to about 11, more preferably about 8 to about 9.

The copper-rich aqueous leaching solution or pregnant leaching solution formed during step (A) preferably has a copper ion concentration in the range of about 0.8 to about 5 grams per liter, more preferably about 1 to about 3 grams per liter. When the leaching solution used in step (A) is a sulfuric acid solution, the concentration of free sulfuric acid in the copper-rich aqueous leaching solution is preferably from about 5 to about 30 grams per liter, more preferably about 10 to about 20 grams per liter. When the leaching solution used in step (A) is an ammonia solution, the concentration of free ammonia in the copper-rich aqueous leaching solution is preferably from about 10 to about 130 grams per liter, more preferably about 30 to about 90 grams per liter.

The water-insoluble extractant used in step (B) of the inventive process can be any water-insoluble extractant capable of extracting copper ions from an aqueous medium. In one embodiment the extractant is dissolved in a water-immiscible organic solvent. (The terms "water-immiscible" and "water-insoluble" refer to compositions that are not soluble in water above a level of about 1 gram per liter at 25° C.) The solvent can be any water-immiscible solvent for the extractant with kerosene, benzene, toluene, xylene, naphthalene, fuel oil, diesel fuel and the like being useful, and with kerosene being preferred. Examples of useful kerosenes include those available from Phillips Petroleum under the trade designations SX-7 and SX-12. The extractant is preferably an organic compound containing at least two functional groups attached to different carbon atoms of a hydrocarbon linkage, one of the functional groups being —OH and the other of said functional groups being =NOH. These compounds can be referred to as oximes.

In one embodiment the extractant is an oxime represented by the formula

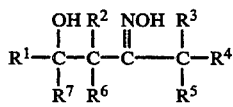

wherein $R^1$, $R^2$, $R^3$, $R^4$, $R^5$, $R^6$ and $R^7$ are independently hydrogen or hydrocarbyl groups. In a preferred embodiment, $R^1$ and $R^4$ are each butyl; $R^2$, $R^3$ and $R^6$ are each hydrogen; and $R^5$ and $R^7$ are each ethyl. Compounds with the structure of this preferred embodiment are available from Henkel Corporation under the trade designation LIX 63.

In one embodiment the extractant is an oxime represented by the formula

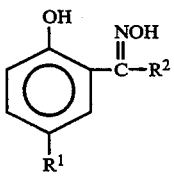

wherein $R^1$ and $R^2$ are independently hydrogen or hydrocarbyl groups. Useful embodiments include those wherein $R^1$ is an alkyl group of about 6 to about 20 carbon atoms, preferably about 9 to about 12 carbon atoms; and $R^2$ is hydrogen, an alkyl group of 1 to about 4 carbon atoms, preferably 1 or 2 carbon atoms, or $R^2$ is phenyl. The phenyl group can be substituted or unsubstituted with the latter being preferred. The following compounds, which are based upon the above-indicated formula, are available from Henkel Corporation under the indicated trade designations and are useful with the inventive process:

| Trade Designation | $R^1$ | $R^2$ |
|---|---|---|
| LIX 65 | Nonyl | Phenyl |
| LIX 84 | Nonyl | Methyl |
| LIX 860 | Dodecyl | Hydrogen |

Other commercially available materials available from Henkel Corporation that are useful include: LIX 64N (identified as a mixture of LIX 65 and LIX 63); and LIX 864 and LIX 984 (identified as mixtures of LIX 860 and LIX 84).

In one embodiment the extractant is a betadiketone represented by the formula

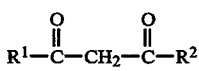

wherein $R^1$ and $R^2$ are independently alkyl groups or aryl groups. The alkyl groups preferably contain 1 to about 10 carbon atoms. The aryl groups are preferably phenyl. An example of a commercial extractant available from Henkel Corporation corresponding to the above formula is LIX 54. These betadiketones are particularly useful when the leaching solution used in step (A) of the inventive process is an ammonia solution.

The concentration of the extractant in the organic solution is preferably in the range of about 2 to about 40% by weight. In one embodiment the organic solution contains from about 5 to about 10%, preferably about 6 to about 8%, more preferably about 7% by weight of LIX 984, with the remainder being SX-7.

In one embodiment the extractant is an ion-exchange resin. These resins are typically small granular or bead-like materials consisting of two principal parts: a resinous matrix serving as a structural portion, and an ion-active group serving as the functional portion. The functional group is preferably selected from those functional groups that are reactive with copper ions. Examples of such functional groups include —$SO_3^-$, —$COO^-$,

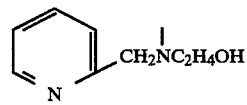

and

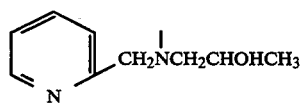

Preferred resin matrixes include the copolymers of styrene and divinylbenzene. Examples of commercially available resins that can be used include IRC-718 (a product of Rohm & Haas identified as a tertiary amine substituted copolymer of styrene and divinylbenzene), IR-200 (a product of Rohm & Haas identified as sulfonated copolymer of styrene and divinylbenzene), IR-120 (a product of Rohm & Haas identified as sulfonated copolymer of styrene and divinyl benzene), XFS 4196 (a product of Dow identified as a macroporous polystyrene/divinylbenzene copolymer to which has been attached N-(2-hydroxyethyl)-picolylamine), and XFS 43084 (a product of Dow identified as a macroporous polystyrene/divinylbenzene copolymer to which has been attached N-(2-hydroxypropyl)-picolylamine). These resins are preferably used in the inventive process as fixed beds or moving beds. During step (B) of the inventive process, the resin is contacted with the copper-rich aqueous leach solution from step (A), the contacting being sufficient to transfer copper ions from the leach solution to the resin. The copper-rich resin is then stripped during step (D) to provide a copper-stripped or copper-depleted resin which can be used during step (B).

The copper-rich extractant that is separated during step (C) of the inventive process preferably has a concentration of copper in the range of about 1 to about 6 grams per liter of extractant, more preferably about 2 to about 4 grams per liter of extractant. The copper-depleted aqueous leaching solution that is separated during step (C) preferably has a copper ion concentration in the range of about 0.01 to about 0.8 grams per liter, more preferably about 0.04 to about 0.2 grams per liter. When the leaching solution used in step (A) is a sulfuric acid solution, the concentration of free sulfuric acid in the copper-depleted aqueous leaching solution separated during step (C) is preferably from about 5 to about 50 grams per liter, more preferably about 5 to about 40 grams per liter, more preferably about 10 to about 30 grams per liter. When the leaching solution used in step (A) is an ammonia solution, the concentration of free ammonia in the copper-depleted aqueous leaching solution separated during step (C) is preferably from about 10 to about 130 grams per liter, more preferably about 30 to about 90 grams per liter.

In one embodiment the contacting and separating steps (B) and (C) of the inventive process are conducted in two stages. In this embodiment, steps (B-1) and (B-2) are contacting steps and (C-1) and (C-2) are separating steps. Thus, in this embodiment, the inventive process involves the following sequential steps (A), (B-1), (C-1), (B-2), (C-2), (D), (E), (F) and (G), with process streams from several of these steps being recirculated to other steps in the process. Step (B-1) involves contacting the copper-rich aqueous leaching solution formed during step (A) with an effective amount of at least one copper-bearing water-insoluble extractant from step (C-2) to transfer copper ions from said copper-rich aqueous leaching solution to said copper-bearing extractant to form a copper-rich extractant and a first copper-depleted aqueous leaching solution. Step (C-1) involves separating the copper-rich extractant formed during step (B-1) from the first copper-depleted aqueous leaching solution formed during step (B-1). The copper-rich extractant that is separated during step (C-1) preferably has a concentration of copper in the range of about 1 to about 6 grams per liter of extractant, more preferably about 2 to about 4 grams per liter of extractant. The first copper-depleted aqueous leaching solution that is separated during step (C-1) preferably has a copper ion concentration in the range of about 0.4 to about 4 grams per liter, more preferably about 0.5 to about 2.4 grams per liter. When the leaching solution used in step (A) is a sulfuric acid solution, the concentration of free sulfuric acid in the first copper-depleted aqueous leaching solution separated during step (C-1) is preferably from about 5 to about 50 grams per liter, more preferably from about 5 to about 30 grams per liter, more preferably about 10 to about 20 grams per liter. When the leaching solution used in step (A) is an ammonia solution, the concentration of free ammonia in the first copper-depleted aqueous leaching solution separated during step (C-1) is preferably from about 10 to about 130 grams per liter, more preferably about 30 to about 90 grams per liter.

Step (B-2) involves contacting the first copper-depleted aqueous leaching solution separated during step (C-1) with an effective amount of at least one copper-depleted extractant from step (E) to transfer copper ions from said first copper-depleted aqueous leaching solution to said copper-depleted extractant to form a copper-bearing extractant and a second copper-depleted aqueous leaching solution. Step (C-2) involves separating the copper-bearing extractant formed during step (B-2) from the second copper-depleted aqueous leaching solution formed during step (B-2). The copper-bearing extractant that is separated during step (C-2) preferably has a concentration of copper in the range of about 0.5 to about 4 grams per liter of extractant, more preferably about 1 to about 2.4 grams per liter of extractant. The second copper-depleted aqueous leaching solution that is separated during step (C-2) preferably has a copper ion concentration in the range of about 0.01 to about 0.8 grams per liter, more preferably about 0.04 to about 0.2 grams per liter. When the leaching solution used in step (A) is a sulfuric acid solution, the concentration of free sulfuric acid in the second copper-depleted aqueous leaching solution separated during step (C-2) is preferably from about 5 to about 50 grams per liter, more preferably about 5 to about 40 grams per liter, more preferably about 10 to about 30 grams per liter. When the leaching solution used in step (A) is an ammonia solution, the concentration of free ammonia in the second copper-depleted aqueous leaching solution separated during step (C-2) is preferably from about 10 to about 130 grams per liter, more preferably about 30 to about 90 grams per liter.

The stripping solution used in step (D) of the inventive process is preferably a sulfuric acid solution which has a free sulfuric acid concentration in the range of about 80 to about 170 grams per liter, more preferably about 90 to about 120 grams per liter. The copper-rich stripping solution that is formed during step (D) preferably has a copper ion concentration in the range of about 50 to about 150 grams per liter, more preferably about 90 to about 110 grams per liter; and a free sulfuric acid concentration in the range of about 70 to about 140, more preferably about 80 to about 110 grams per liter.

The electrodeposition steps (F) and (G) of the inventive process involve advancing the copper-rich stripping solution from step (E) into an electroforming cell. The copper-rich stripping solution treated in the electroforming cell can be referred to as either a copper-rich stripping solution or an electrolyte solution. Preferably it is subjected to a purification or filtering process prior to entering the electroforming cell to ensure that the electrodeposited foil contains no disruptions and/or discontinuities. When voltage is applied between the anode and cathode, electrodeposition of copper occurs at the cathode. The electric current is preferably direct current or alternating current with a direct current bias. The electrodeposited foil is removed from the cathode as a continuous thin web as the cathode rotates. It can be collected in roll form. The rotating cathode preferably is in the form of a cylindrical mandrel. However, alternatively, the cathode can be in the form of a moving belt. Both of these designs are known in the art. The anode has a curved shape conforming to the curved shape of the cathode to provide a uniform gap between the anode and the cathode. This gap is preferably from about 0.3 to about 2 centimeters in length.

The velocity of the flow of the electrolyte solution through the gap between the anode and the cathode is preferably in the range of about 0.2 to about 5 meters per second, more preferably about 1 to about 3 meters per second. The electrolyte solution preferably has a free sulfuric acid concentration in the range of about 70 to about 170 grams per liter, more preferably about 80 to about 120 grams per liter. The temperature of the of the electrolyte solution in the electroforming cell is preferably in the range of about 25° C. to about 100° C., more preferably about 40° C. to about 70° C. The copper ion concentration (contained in $CuSO_4$) is preferably in the range of about 40 to about 150 grams per liter, more preferably from about 70 to about 130 grams per liter, more preferably about 90 to about 110 grams per liter. The free chloride ion concentration is preferably up to about 300 ppm, more preferably up to about 150 ppm, more preferably up to about 100 ppm. In one embodiment the free chloride ion concentration is from about 40 to about 100 ppm, or about 50 to about 80 ppm. The impurity level is preferably at a level no more than about 20 grams per liter, and typically is in the range of about 0.5 to about 10 grams per liter. The current density is preferably in the range of about 100 to about 3000 amps per square foot, more preferably about 400 to about 1800 amps per square foot.

During electrodeposition the electrolyte solution can optionally contain one or more active sulfur-containing materials. The term "active-sulfur containing material" refers to materials characterized generally as containing a bivalent sulfur atom both bonds of which are directly connected to a carbon atom together with one or more nitrogen atoms also directly connected to the carbon atom. In this group of compounds the double bond may in some cases exist or alternate between the sulfur or nitrogen atom and the carbon atom. Thiourea is a useful active sulfur-containing material. The thioureas having the nucleus

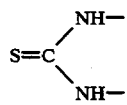

and the iso-thiocyanates having the grouping S=C=N- are useful. Thiosinamine (allyl thiourea) and thiosemicarbazide are also useful. The active sulfur-containing material should be soluble in the electrolyte solution and be compatible with the other constituents. The concentration of active sulfur-containing material in the electrolyte solution during electrodeposition is preferably up to about 20 ppm, more preferably in the range of about 0.1 to about 15 ppm.

The electrolyte solution can also optionally contain one or more gelatins. The gelatins that are useful herein are heterogeneous mixtures of water-soluble proteins derived from collagen. Animal glue is a preferred gelatin because it is relatively inexpensive, commercially available and convenient to handle. The concentration of gelatin in the electrolyte solution is preferably up to about 20 ppm, more preferably up to about 10 ppm, and preferably in the range of about 0.2 to about 10 ppm.

The electrolyte solution can also optionally contain other additives known in the art for controlling the properties of the electrodeposited foil. Examples include molasses, guar gum, the polyalkylene glycols (e.g., polyethylene glycol, polypropylene glycol, polyisopropylene glycol, etc.), dithiothreitol, amino acids (e.g., proline, hydroxyproline, cysteine, etc.), acrylamide, sulfopropyl disulfide, tetraethylthiuram disulfide, benzyl chloride, epichlorohydrin, chlorohydroxylpropyl sulfonate, alkylene oxides (e.g., ethylene oxide, propylene oxide, etc.), the sulfonium alkane sulfonates, thiocarbamoyldisulfide, selenic acid, or a mixture of two or more thereof. These additives are preferably used in concentrations of up to about 20 ppm, more preferably about 1 to about 10 ppm.

During the electrodeposition step (F) it is preferred to maintain the ratio of applied current density (I) to diffusion limited current density ($I_L$) at a level of about 0.4 or less, more preferably about 0.3 or less. That is, $I/I_L$ is preferably about 0.4 or less, more preferably about 0.3 or less. The applied current density (I) is the number of amperes applied per unit area of electrode surface. The diffusion limited current density ($I_L$) is the maximum rate at which copper can be deposited. The maximum deposition rate is limited by how fast copper ions can diffuse to the surface of the cathode to replace those depleted by previous deposition. It can be calculated by the equation $$I_L = \frac{nFDC^\circ}{\delta(1-t)}$$

The terms used in the foregoing equation and their units are defined below:

| Symbol | Description | Units |
|---|---|---|
| I | Current Density | Amperes/cm$^2$ |
| $I_L$ | Diffusion Limited Current Density | Amperes/cm$^2$ |
| n | Equivalent Charge | Equivalents/mole |
| F | Faraday's Constant | 96487 (Amp)(second)/equivalent |
| C* | Bulk Cupric Ion Concentration | Mole/cm$^3$ |
| D | Diffusion Coefficient | cm$^2$/second |
| δ | Concentration Boundary Layer Thickness | cm |
| t | Copper transfer number | dimensionless |

The boundary layer thickness δ is a function of viscosity, diffusion coefficient, and flow velocity. In one embodiment the following parameter values are useful in electrodepositing foil:

| Parameter | Value |
|---|---|
| I (A/cm$^2$) | 1.0 |
| n (eq/mole) | 2 |
| D (cm$^2$/s) | 3.5 × 10$^{-5}$ |
| C* (mole/cm$^3$, Cu$^{+2}$ (as CuSO$_4$)) | 1.49 × 10$^{-3}$ |
| Temperature (°C.) | 60 |
| Free sulfuric acid (g/l) | 90 |
| Kinematic Viscosity (cm$^2$/s) | 0.0159 |
| Flow rate (cm/s) | 200 |

Referring now to FIG. 1 which is a flow sheet illustrating a preferred embodiment of the inventive process, a copper leach dump 10 is treated in accordance with the inventive process to produce a copper foil 12. The process involves the use of settlers 14, 15 and 16, collection pond 17, mixers 18, 20 and 22, electroforming cell 24 which includes rotating cylindrical cathode 26 and anode 28, and filters 30 and 32. In this embodiment step (A) of the inventive process is conducted at the leach dump 10. Steps (B) and (C) are conducted in two stages using mixers 18 and 20 and settlers 14 and 15. Steps (D) and (E) are conducted using mixer 22 and settler 16. Steps (F) and (G) are conducted using electroforming cell 24.

Aqueous leach solution from line 40 is sprayed onto the surface of the leach dump 10. The leach solution is a sulfuric acid solution having a free sulfuric acid concentration in the range of about 5 to about 50, more preferably about 5 to about 40, more preferably about 10 to about 30 grams per liter. The leach solution percolates down through the dump, dissolves copper in the ore, flows through the dump space 11 as a copper-rich aqueous leach solution (sometimes referred to as a pregnant leach solution), flows through line 13 into collection pond 17 and from there is pumped through line 41 into mixer 20. The copper-rich aqueous leach solution that is pumped to mixer 20 preferably has a copper ion concentration in the range of about 0.8 to about 5, more preferably about 1 to about 3 grams per liter; and a free sulfuric acid concentration in the range of about 5 to about 30, more preferably about 10 to about 20 grams per liter. In mixer 20 the copper-rich aqueous leach solution is mixed with a copper-bearing organic solution which is pumped into mixer 20 through lines 79, 80 and 42 from weir 78 in settler 15. The concentration of copper in the copper-bearing organic solution that is added to mixer 20 is preferably from about 0.4 to about 4 grams per liter of extractant in the organic solution, more preferably about 1 to about 2.4 grams per liter of extractant in the organic solution. During the mixing in mixer 20 an organic phase and an aqueous phase form and intermix. Copper ions transfer from the aqueous phase to the organic phase. The mixture is pumped from mixer 20 through line 43 to settler 14. In settler 14 the aqueous phase and organic phase separate with the organic phase forming the top layer and the aqueous phase forming the bottom layer. The organic phase collects in weir 48 and is pumped through lines 49, 50 and 51 to mixer 22. This organic phase is a copper-rich organic solution (which can be referred to as a loaded organic). This copper-rich organic solution preferably has a copper concentration in the range of about 1 to about 6 grams per liter of extractant in the organic solution, more preferably about 2 to about 4 grams per liter of extractant in the organic solution.

The copper-rich organic solution is mixed in mixer 22 with a copper-depleted stripping solution. The copper-depleted stripping solution (which can be referred to as a lean electrolyte) is produced in the electroforming cell 24 and is pumped through lines 52, 54, 56, 58 and 60 to mixer 22. This copper-depleted stripping solution preferably has a free sulfuric acid concentration in the range of about 80 to about 170, more preferably about 90 to about 120 grams per liter; and a copper ion concentration in the range of preferably about 40 to about 120, more preferably about 80 to about 100, more preferably about 90 to about 95 grams per liter. Fresh stripping solution make-up can be added to line 60 through line 62. The copper-rich organic solution and copper-depleted stripping solution are mixed in mixer 22 with the result being the formation of an organic phase intermixed with an aqueous phase. Copper ions transfer from the organic phase to the aqueous phase. The mixture is pumped from mixer 22 through line 63 to settler 16. In settler 16 the organic phase separates from the aqueous phase with the organic phase collecting in weir 64. This organic phase is a copper-depleted organic solution (which is sometimes referred to as a barren organic). This copper-depleted organic solution preferably has a copper concentration in the range of about 0.5 to about 2 grams per liter of extractant in the organic solution, more preferably about 0.9 to about 1.5 grams per liter of extractant in the organic solution. The copper depleted organic solution is pumped from settler 16 through lines 65, 66, 68 and 70 to mixer 18. Fresh organic solution make-up can be added to line 68 through line 72.

Copper-containing aqueous leach solution is pumped from settler 14 through lines 73, 74, 75 and 76 to mixer 18. This copper-containing aqueous leach solution preferably has a copper ion concentration in the range of about 0.4 to about 4, more preferably about 0.5 to about 2.4 grams per liter; and a free sulfuric acid concentration in the range of about 5 to about 50, more preferably about 5 to about 30, more preferably about 10 to about 20 grams per liter. In mixer 18 an organic phase and aqueous phase form, intermix and copper ions transfer from the aqueous phase to the organic phase. The mixture is pumped through line 77 to settler 15. In settler 15 the organic phase separates from the aqueous phase with the organic phase collecting in weir 78. This organic phase, which is a copper-containing organic solution, is pumped from settler 15 through lines 79, 80 and 42 to mixer 20. This copper-containing organic solution preferably has a copper concentration in the range of about 0.5 to about 4 grams per liter of extractant in the organic solution, more preferably about 1 to about 2.4 grams per liter of extractant in the organic solution. The aqueous phase in settler 15 is a copper-depleted aqueous leaching solution which is pumped through lines 81 and 82 to line 40 wherein it is sprayed over the leach dump 10. Fresh leaching solution make-up can be added to line 81 through 83.

The aqueous phase which separates out in settler 16 is a copper-rich stripping solution. It is pumped from settler 16 through lines 85 and 86 to filter 30 and from filter 30 through lines 87 and 88 to electroforming cell 24. This copper-rich stripping solution preferably has a copper ion concentration in the range of about 50 to about 150, more preferably about 90 to about 110 grams per liter; and a free sulfuric acid concentration in the range of about 70 to about 140, more preferably about 80 to about 110 grams per liter. The copper-rich stripping solution entering electroforming cell 24 can also be referred to as electrolyte solution 25. The electrolyte solution 25 flows in the gap 27 between rotating cathode 26 and anode 28. When voltage is applied between the anode 28 and cathode 26, electrodeposition of copper occurs at the cathode surface 26a. The electrodeposited foil is removed from the cathode as a continuous thin web 12 as the cathode rotates and is collected as foil roll 12a.

The electrolyte solution 25 is converted to a copper-depleted electrolyte solution in electroforming cell 24 and is withdrawn from cell 24 through line 52. The copper-depleted electrolyte solution in line 52 preferably has a copper ion concentration in the range of about 40 to about 120, more preferably about 80 to about 100, more preferably about 90 to about 95 grams per liter; and a free sulfuric acid concentration in the range of about 80 to about 170, more preferably about 90 to about 120 grams per liter. This copper-depleted electrolyte is either: (1) recirculated through lines 52, 54 and 89 to filter 32 and through filter 32 to lines 90, 91 and 88 and back to cell 24; or (2) pumped through lines 52, 54, 56, 58 and 60 to mixer 22 as the copper-depleted stripping solution. Optionally, active-sulfur containing material, gelatin and/or other desirable additives of the type discussed above are added to the recirculating solution in line 89 through line 92 or in line 88 through line 93.

In the electroforming cell 24, electrical means that are well known in the art are provided for applying an electrical current between anode 28 and cathode 26. The current is preferably direct current or alternating current with a direct current bias. Copper ions in electrolyte solution 25 gain electrons at the peripheral surface 26a of cathode 26 whereby metallic copper plates out in the form of a foil layer. Cathode 26 rotates continuously about its axis 26b and the foil layer is continuously withdrawn from cathode surface 26a as a continuous web 12 which is collected as roll 12a.

The electrodeposition process in the electroforming cell 24 depletes the electrolyte solution 25 of copper ions, and, if used, gelatin and active-sulfur containing material. These ingredients are replenished, the electrolyte being replenished through line 88, the gelatin and active-sulfur containing material being replenished through lines 92 or 93.

Although the embodiment depicted in FIG. 1 employs a two-stage solvent extraction step using mixers 18 and 20 and settlers 14 and 15, those skilled in the art will recognize that additional extraction stages can be added to the process without departing from the essence of the invention. Thus, for example, while FIG. 1 specifically discloses a two-stage extraction step, and the foregoing discussion refers to single-stage and two-stage extractions, the inventive process can be conducted using a three-stage, four-stage, five-stage, six-stage, etc., extraction step. Similarly, although the embodiment depicted in FIG. 1 employs a single-stage stripping step using mixer 22 and settler 16, those skilled in the art will recognize that additional stripping stages can be added to the process without departing from the essence of the invention. Thus, for example, the inventive process can be conducted using a two-stage, three-stage, four-stage, five-stage, six-stage, etc., stripping step.

The term "untreated" is used herein to refer to raw or base foil that has not undergone subsequent treatment for the purpose of refining or enhancing the foil properties. The term "treated" is used herein to refer to raw or base foil that has undergone such treatment. This treatment is entirely conventional and typically involves the use of various treating and rinsing solutions. For example, in one embodiment at least one side of the foil is treated with at least one roughened layer of copper or copper oxide. In another embodiment at least one side of the foil is treated with at least one metallic layer, the metal in said metallic layer being selected from the group consisting of indium, zinc, tin, nickel, cobalt, copper-zinc alloy and copper-tin alloy. In another embodiment at least one side of the foil is treated with at least one metallic layer, the metal in said metallic layer being selected from the group consisting of tin, chromium, and chromium-zinc alloy. In another embodiment at least one side of the foil is treated with at least one roughened layer of copper or copper oxide, then at least one metallic layer is applied to the roughened layer, the metal in the metallic layer being selected from the group consisting of indium, zinc, tin, nickel, cobalt, copper-zinc alloy and copper-tin alloy. In another embodiment at least one side of the foil is treated with at least one toughened layer of copper or copper oxide, then at least one metallic layer is applied to the toughened layer, the metal in said metallic layer being selected from the group consisting of tin, chromium, and chromium-zinc alloy. In another embodiment at least one side of the foil is treated with at least one roughened layer of copper or copper oxide, then at least one first metallic layer is applied to the toughened layer, the metal in said first metallic layer being selected from the group consisting of indium, zinc, tin, nickel, cobalt, copper-zinc alloy and copper-tin alloy, then at least one second metallic layer is applied to the first metallic layer, the metal in the second metallic layer being selected from the group consisting of tin, chromium, and chromium-zinc alloy. These treating techniques are well-known in the art.

The inventive copper foils have a smooth or shiny (drum) side and a rough or matte (copper deposit growth front) side. These foils can be bonded to dielectric substrates to provide dimensional and structural stability thereto, and in this regard, it is preferred to bond the matte side of the electrodeposited foil to the substrate so that the shiny side of the foil faces outwardly from the laminate. Useful dielectric substrates may be prepared by impregnating woven glass reinforcement materials with partially cured resins, usually epoxy resins. These dielectric substrates are sometimes referred to as prepregs.

In preparing the laminates, it is useful for both the prepreg material and the electrodeposited copper foil to be provided in the form of long webs of material rolled up in rolls. The rolled materials are drawn off the rolls and cut into rectangular sheets. The rectangular sheets are then laid-up or assembled in stacks of assemblages. Each assemblage may comprise a prepreg sheet with a sheet of foil on either side thereof, and in each instance, the matte side of the copper foil sheet is positioned adjacent the prepreg so that the shiny sides of the sheets of foil face outwardly on each side of the assemblage.

The assemblage may be subjected to conventional laminating temperatures and pressures between the plates of laminating presses to prepare laminates comprising sandwiches of a sheet of prepreg between sheets of copper foil.

The prepregs may consist of a woven glass reinforcement fabric impregnated with a partially cured two-stage resin. By application of heat and pressure, the matte side of the copper foil is pressed tightly against the prepreg and the temperature to which the assemblage is subjected activates the resin to cause curing, that is crosslinking of the resin and thus tight bonding of the foil to the prepreg dielectric substrate. Generally speaking, the laminating operation will involve pressures in the range of from about 250 to about 750 psi, temperatures in the range of from about 175° C. to 235° C. and a laminating cycle of from about 40 minutes to about 2 hours. The finished laminate may then be utilized to prepare printed circuit boards (PCB).

A number of manufacturing methods are available for preparing PCBs from laminates. Additionally, there is a myriad of possible end use applications including radios, televisions, computers, etc., for the PCB's. These methods and end uses are known in the art.

The following example is provided for purposes of illustrating the invention. Unless otherwise indicated, in the following example as well as throughout the specification and claims, all parts and percentages are by weight, all temperatures are in degrees centigrade, and all pressures are atmospheric.

EXAMPLE 1

A copper foil is prepared using the process illustrated in FIG. 1 with the exception that a laboratory-scale electroforming cell having parallel plate electrodes is used rather than the electroforming cell 24 illustrated in FIG. 1. The anode is iridium-coated titanium. The cathode is titanium. The cathode is removable so that copper foil can be peeled from it. A reservoir equipped with a filter is used to hold the electrolyte solution and means are provided to pump the electrolyte solution to and from the electroforming cell. The aqueous leaching solution sprayed onto the leach dump 10 from line 40 is a sulfuric acid solution having a sulfuric acid concentration of 20 grams per liter. The copper-rich aqueous leach solution that is pumped to mixture 20 through line 41 has a copper ion concentration of 1.8 grams per liter and a free sulfuric acid concentration of 12 grams per liter. The organic solution is a 7% by weight solution of LIX 984 in SX-7. The concentration of copper in the copper-bearing organic solution that is added to mixer 20 from settler 15 has a copper concentration of 1.95 grams per liter. The copper-rich organic solution that is pumped to mixer 22 from settler 14 has a copper concentration of 3 grams per liter of LIX 984. The copper-depleted stripping solution added to mixer 22 from line 60 has a free sulfuric acid concentration of 110 grams per liter and a copper ion concentration of 40 grams per liter. (This copper-depleted stripping solution is pumped through line 60 to mixer 22 from an EW facility which is not part of the inventive process.) The copper-depleted organic solution that is pumped from settler 16 to mixer 18 has a copper concentration of 1.25 grams per liter of LIX 984. The copper-containing aqueous leach solution pumped from settler 14 to mixer 18 has a copper ion concentration of 0.8 grams per liter and a free sulfuric acid concentration of 12 grams per liter. The copper-depleted aqueous solution pumped from settler 15 through line 81 has a copper concentration of 0.15 grams per liter and a free sulfuric acid concentration of 12 grams per liter. The copper-rich stripping solution taken from settler 16 has a copper ion concentration of 50 grams per liter and a free sulfuric acid concentration of 160 grams per liter. 140 gallons of this copper-rich stripping solution are recirculated through a mixer/settler at a rate of 2 gallons per minute (gpm). A fresh stream of copper-rich organic solution having a copper concentration of 3 grams per liter of LIX 984 in the solution is added to the mixer, also at a rate of 2 gpm. Sulfuric acid is added as needed to ensure acceptable stripping kinetics. The temperature of the copper-rich stripping solution is maintained at or above 37.8° C. to prevent crystallization of copper sulfate. The final electrolyte solution produced from this procedure has a copper ion concentration of 92 grams per liter and a free sulfuric acid concentration of 83 grams per liter. The foil samples that are made in the electroforming cell using this electrolyte solution have a nominal weight of one ounce per square foot. The operating conditions used in the electroforming cell and the properties of the foil samples that are made are as follows:

| Current Density (ASF)[1] | Temp. °C. | Velocity (cm/s) | Guar Gum (ppm) | Cl* (ppm) | RTT[2] (kpsi) | RTE[3] (%) | HTT[4] (kpsi) | HTE[5] (%) | $R_{tm}$[6] ($\mu$) |
|---|---|---|---|---|---|---|---|---|---|
| 500 | 52 | 138 | 0 | 27 | 58.0 | 12.3 | 35.7 | 4.6 | 6.54 |
| 1500 | 52 | 207 | 0 |  | 62.7 | 3.6 | 31.2 | 2.3 | 19.00 |
| 1000 | 58.5 | 172 | 0 |  | 59.5 | 8.6 | 34.6 | 4.5 | 11.11 |
| 1000 | 58.5 | 172 | 0 |  | 60.6 | 12.4 | 34.6 | 4.5 | 7.24 |
| 500 | 65 | 138 | 0 |  | 50.2 | 7.5 | 31.1 | 7.0 | 7.38 |
| 1500 | 65 | 207 | 0 | 21 | 60.6 | 8.8 | 33.3 | 4.1 | 11.40 |
| 500 | 52 | 138 | 4 | 21 | 58.5 | 8.8 | 33.2 | 3.3 | 6.64 |
| 1500 | 52 | 207 | 4 |  | 68.2 | 5.5 | 31.9 | 2.1 | 20.80 |
| 1000 | 58.5 | 172 | 4 |  | 59.0 | 12.3 | 31.7 | 5.1 | 12.31 |
| 1000 | 58.5 | 172 | 4 |  | 58.4 | 8.1 | 31.0 | 7.2 | 9.74 |
| 500 | 65 | 138 | 4 |  | 50.9 | 16.2 | 27.7 | 11.9 | 6.92 |
| 1500 | 65 | 207 | 4 |  | 58.9 | 12.0 | 30.5 | 7.9 | 9.87 |

[1]ASF - Amps per square foot.
[2]RTT - Room temperature ultimate tensile strength (kpsi = 1000 psi).
[3]RTE - Room temperature elongation.
[4]HTT - Ultimate tensile strength at 180° C. (kpsi = 1000 psi).
[5]HTE - Elongation at 180° C.
[6]$R_{tm}$ - Roughness in microns measured with Surtronic 3 profilometer.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for making copper foil from a copper-bearing material comprising:

(A) contacting said copper-bearing material with an effective amount of at least one aqueous leaching solution to dissolve copper ions into said leaching solution and form a copper-rich aqueous leaching solution;

(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution;

(C) separating said copper-rich extractant from said copper-depleted aqueous leaching solution;

(D) contacting said copper-rich extractant with an effective amount of at least one aqueous stripping solution to transfer copper ions from said extractant to said stripping solution to form a copper-rich stripping solution and a copper-depleted extractant;

(E) separating said copper-rich stripping solution from said copper-depleted extractant;

(F) flowing said copper-rich stripping solution between an anode and a rotating cathode, and applying an effective amount of voltage across said anode and said cathode to deposit copper on said cathode; and (G) continuously removing copper foil from said cathode.

2. The process of claim 1 with the step of separating said copper-rich aqueous solution formed in step (A) from said copper-bearing material.

3. The process of claim 1 wherein said copper-bearing material is copper ore, smelter flue dust, copper cement, copper sulfate or copper-containing waste.

4. The process of claim 1 wherein said aqueous leaching solution comprises sulfuric acid or ammonia.

5. The process of claim 1 wherein said extractant in step (B) is dissolved in an organic solvent selected from the group consisting of kerosene, benzene, naphthalene, fuel oil and diesel fuel.

6. The process of claim 1 wherein said extractant in step (B) is dissolved in kerosene.

7. The process of claim 1 wherein said extractant in step (B) comprises at least one compound represented by the formula

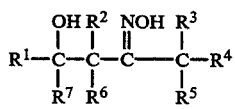

wherein $R^1$, $R^2$, $R^3$, $R^4$, $R^5$, $R^6$ and $R^7$ are independently hydrogen or hydrocarbyl groups.

8. The process of claim 1 wherein said extractant in step (B) comprises at least one compound represented by the formula

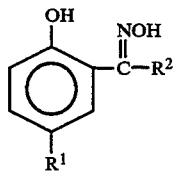

wherein $R^1$ and $R^2$ are independently hydrogen or hydrocarbyl groups.

9. The process of claim 1 wherein said extractant in step (B) comprises at least one compound represented by the formula

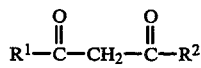

wherein $R^1$ and $R^2$ are independently alkyl groups or aryl groups.

10. The process of claim 1 wherein said stripping solution comprises sulfuric acid.

11. The process of claim 1 wherein prior to or during step (F) said stripping solution has a copper ion concentration in the range of about 40 to about 150 grams per liter and a free sulfuric acid concentration in the range of about 70 to about 170 grams per liter.

12. The process of claim 1 further comprising the step of adding to said stripping solution prior to or during step (F) at least on active-sulfur containing material and/or at least one gelatin.

13. The process of claim 1 wherein $I/I_l$ during step (F) is about 0.4 or less.

14. A process for making copper foil from a copper-bearing material comprising:

(A) contacting said copper-bearing material with an effective amount of at least one aqueous leaching solution to dissolve copper ions into said leaching solution and form a copper-rich aqueous leaching solution;

(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution, said extractant comprising at least one ion exchange resin;

(C) separating said copper-rich extractant from said copper-depleted aqueous leaching solution;

(D) contacting said copper-rich extractant with an effective amount of at least one aqueous stripping solution to transfer copper ions from said extractant to said stripping solution to form a copper-rich stripping solution and a copper-depleted extractant;

(E) separating said copper-rich stripping solution from said copper-depleted extractant;

(F) flowing said copper-rich stripping solution between an anode and a rotating cathode, and applying an effective amount of voltage across said anode and said cathode to deposit copper on said cathode; and (G) continuously removing copper foil from said cathode.

15. The process of claim 14 wherein said ion exchange resin is characterized by the presence of at least one functional group selected from $-SO_3^-$, $-COO^-$,

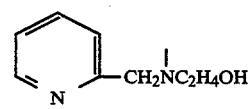

and

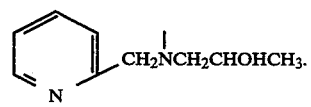

16. The process of claim 14 wherein said ion exchange resin is a copolymer of styrene and divinylbenzene.

17. A process for making copper foil from a copper-bearing material comprising:

(A) contacting said copper-bearing material with an effective amount of at least one sulfuric acid leaching solution to dissolve copper ions into said leaching solution and form a copper-rich leaching solution;

(B) contacting said copper-rich leaching solution with an effective amount of a water-insoluble extractant to transfer copper ions from said copper-rich leaching solution to said extractant to form a copper-rich extractant and a copper-depleted leaching solution, said extractant comprising at least one water-insoluble organic compound characterized by a hydrocarbon linkage with at least one —0H group and at least one =NOH group attached to different carbon atoms on said hydrocarbon linkage;

(C) separating said copper-rich extractant from said copper-depleted leaching solution;

(D) contacting said copper-rich extractant with an effective amount of at least one sulfuric acid stripping solution to transfer copper ions from said copper-rich extractant to said stripping solution to form a copper-rich stripping solution and a copper-depleted extractant;

(E) separating said copper-rich stripping solution from said copper-depleted extractant;

(F) flowing said copper-rich stripping solution between an anode and a rotating cathode, and applying an effective amount of voltage across said anode and said cathode to deposit copper on said cathode; and (G) continuously removing copper foil from said cathode.

18. A process for making copper foil from a copper-bearing material, said process comprising:

(A) contacting said copper-bearing material with an effective amount of at least one aqueous leaching solution to dissolve copper ions into said leaching solution and form a copper-rich aqueous leaching solution;

(B-1) contacting said copper-rich aqueous leaching solution with an effective amount of at least one copper-bearing water-insoluble extractant from step (C-2) to transfer copper ions from said copper-rich aqueous leaching solution to said copper-bearing extractant to form a copper-rich extractant and a first copper-depleted aqueous leaching solution;

(C-1) separating said copper-rich extractant from said first copper-depleted aqueous leaching solution, advancing said copper-rich extractant to step (D);

(B-2) contacting said first copper-depleted aqueous leaching solution from step (C-1) with an effective amount of at least one copper-depleted extractant from step (E) to transfer copper ions from said first copper-depleted aqueous leaching solution to said copper-depleted extractant to form a copper-bearing extractant and a second copper-depleted aqueous leaching solution;

(C-2) separating said copper-bearing extractant from said second copper-depleted aqueous leaching solution, recirculating said copper-bearing extractant to step (B-1);

(D) contacting said copper-rich extractant from step (C-1) with an effective amount of at least one aqueous stripping solution to transfer copper ions from said copper-rich extractant to said stripping solution to form a copper-rich stripping solution and a copper-depleted extractant;

(E) separating said copper-rich stripping solution from said copper-depleted extractant, recirculating said copper-depleted extractant to step (B-2);

(F) flowing said copper-rich stripping solution between an anode and a rotating cathode, and applying an effective amount of voltage across said anode and said cathode to deposit copper on said cathode; and (G) continuously removing copper foil from said cathode.

19. A process for making copper foil from a copper-bearing material comprising:

(A) contacting said copper-bearing material with an effective amount of at least one aqueous leaching solution to dissolve copper ions into said leaching solution and form a copper-rich aqueous leaching solution;

(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution;

(C) separating said copper-rich extractant from said copper-depleted aqueous leaching solution;

(D) contacting said copper-rich extractant with an effective amount of at least one aqueous stripping solution to transfer copper ions from said extractant to said stripping solution to form a copper-rich stripping solution and a copper-depleted extractant;

(E) separating said copper-rich stripping solution from said copper-depleted extractant;

(F) adding at least one additive to said copper-rich stripping solution and flowing said copper-rich stripping solution between an anode and a rotating cathode; said additive being selected from the group consisting of molasses, guar gum, polyethylene glycol, polypropylene glycol, polyisopropylene glycol, dithiothreitol, proline, hydroxyproline, cysteine, acrylamide, sulfopropyl disulfide, tetraethylthiuram disulfide, benzyl chloride, epichlorohydrin, chlorohydroxylpropylsulfonate, ethylene oxide, propylene oxide, sulfonium alkane sulfonate, thiocarbamoyldisulfide and selenic acid; and applying an effective amount of voltage across said anode and said cathode to deposit copper on said cathode; and (G) continuously removing copper foil from said cathode.

20. A process for making copper foil from a copper-bearing material comprising:

(A) contacting said copper-bearing material with an effective amount of at least one aqueous leaching solution to dissolve copper ions into said leaching solution and form a copper-rich aqueous leaching solution;

(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution;

(C) separating said copper-rich extractant from said copper-depleted aqueous leaching solution;

(D) contacting said copper-rich extractant with an effective amount of at least one aqueous stripping solution to transfer copper ions from said extractant to said stripping solution to form a copper-rich stripping solution and a copper-depleted extractant;

(E) separating said copper-rich stripping solution from said copper-depleted extractant;

(F) flowing said copper-rich stripping solution between an anode and a rotating cathode, and applying an effective amount of voltage across said anode and said cathode to deposit copper on said cathode; and (G) continuously removing copper foil from said cathode, and applying to at least one side of said foil at least one roughened layer of copper or copper oxide.

21. A process for making copper foil from a copper-bearing material comprising:

(A) contacting said copper-bearing material with an effective amount of at least one aqueous leaching solution to dissolve copper ions into said leaching solution and form a copper-rich aqueous leaching solution;

(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution;

(C) separating said copper-rich extractant from said copper-depleted aqueous leaching solution;

(D) contacting said copper-rich extractant with an effective amount of at least one aqueous stripping solution to transfer copper ions from said extractant to said stripping solution to form a copper-rich stripping solution and a copper-depleted extractant;

(E) separating said copper-rich stripping solution from said copper-depleted extractant;

(F) flowing said copper-rich stripping solution between an anode and a rotating cathode, and applying an effective amount of voltage across said anode and said cathode to deposit copper on said cathode; and (G) continuously removing copper foil from said cathode, and applying to at least one side of said foil at least one metallic layer, the metal in said metallic layer being selected from the group consisting of indium, zinc, tin, nickel, cobalt, copper-zinc alloy and copper-tin alloy.

22. A process for making copper foil from a copper-bearing material comprising:

(A) contacting said copper-bearing material with an effective amount of at least one aqueous leaching solution to dissolve copper ions into said leaching solution and form a copper-rich aqueous leaching solution;

(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution;

(C) separating said copper-rich extractant from said copper-depleted aqueous leaching solution;

(D) contacting said copper-rich extractant with an effective amount of at least one aqueous stripping solution to transfer copper ions from said extractant to said stripping solution to form a copper-rich stripping solution and a copper-depleted extractant;

(E) separating said copper-rich stripping solution from said copper-depleted extractant;

(F) flowing said copper-rich stripping solution between an anode and a rotating cathode, and applying an effective amount of voltage across said anode and said cathode to deposit copper on said cathode; and (G) continuously removing copper foil from said cathode, and applying to at least one side of said foil at least one metallic layer, the metal in said metallic layer being selected from the group consisting of tin, chromium, and chromium-zinc alloy.

23. A process for making copper foil from a copper-bearing material comprising:

(A) contacting said copper-bearing material with an effective amount of at least one aqueous leaching solution to dissolve copper ions into said leaching solution and form a copper-rich aqueous leaching solution;

(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution;

(C) separating said copper-rich extractant from said copper-depleted aqueous leaching solution;

(D) contacting said copper-rich extractant with an effective amount of at least one aqueous stripping solution to transfer copper ions from said extractant to said stripping solution to form a copper-rich stripping solution and a copper-depleted extractant;

(E) separating said copper-rich stripping solution from said copper-depleted extractant;

(F) flowing said copper-rich stripping solution between an anode and a rotating cathode, and applying an effective amount of voltage across said anode and said cathode to deposit copper on said cathode; and (G) continuously removing copper foil from said cathode, and applying to at least one side of said foil at least one roughened layer of copper or copper oxide, then applying to said roughened layer at least one first metallic layer, the metal in said first metallic layer being selected from the group consisting of indium, zinc, tin, nickel, cobalt, copper-zinc alloy and copper-tin alloy, then applying to said first metallic layer at least one second metallic layer, the metal in said second metallic layer being selected from the group consisting of tin, chromium, and chromium-zinc alloy.

* * * * *